(12) United States Patent
Scott et al.

(10) Patent No.: US 11,635,851 B2
(45) Date of Patent: Apr. 25, 2023

(54) SENSOR FILTER FOR CALIBRATING A TOUCH SYSTEM

(71) Applicant: Tactual Labs Co., New York, NY (US)

(72) Inventors: Douglas Ainsworth Scott, Bracknell (GB); Daniel John Morelli, Georgetown, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/439,978

(22) Filed: Jun. 13, 2019

(65) Prior Publication Data

US 2019/0384476 A1 Dec. 19, 2019

Related U.S. Application Data

(60) Provisional application No. 62/684,303, filed on Jun. 13, 2018.

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05); *G06F 3/04166* (2019.05); *G06F 2203/04104* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 2010/0214232 A1* | 8/2010 | Chan | G06F 3/04182 345/173 |
| 2014/0340351 A1* | 11/2014 | Forlines | G06F 3/044 345/174 |
| 2014/0354579 A1* | 12/2014 | Paskalev | G06F 3/0418 345/174 |
| 2017/0045957 A1* | 2/2017 | Holmgren | G06F 3/0354 |
| 2017/0371487 A1* | 12/2017 | Morelli | G06F 3/0446 |

* cited by examiner

*Primary Examiner* — Christopher R Lamb
(74) *Attorney, Agent, or Firm* — Adam Landa

(57) ABSTRACT

Calibration signals are transmitted across a touch panel in order to establish a baseline heat map. The touch panel may have a variety of differently transmitted frequencies and or patterns of signals that are able to help establish a baseline heat map upon which future touch events can be compared in order to improve characteristics of the receipt of the touch events by, for example, improving the ability to determine coupling.

17 Claims, 3 Drawing Sheets

SENSOR FILTER FOR CALIBRATING A TOUCH SYSTEM

This Application claims the benefit of U.S. Provisional Patent Application No. 62/684,303, filed Jun. 13, 2018, the contents of which are hereby incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of user input, and in particular to devices sensitive to touch, including, hover and pressure.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

Figure 1:
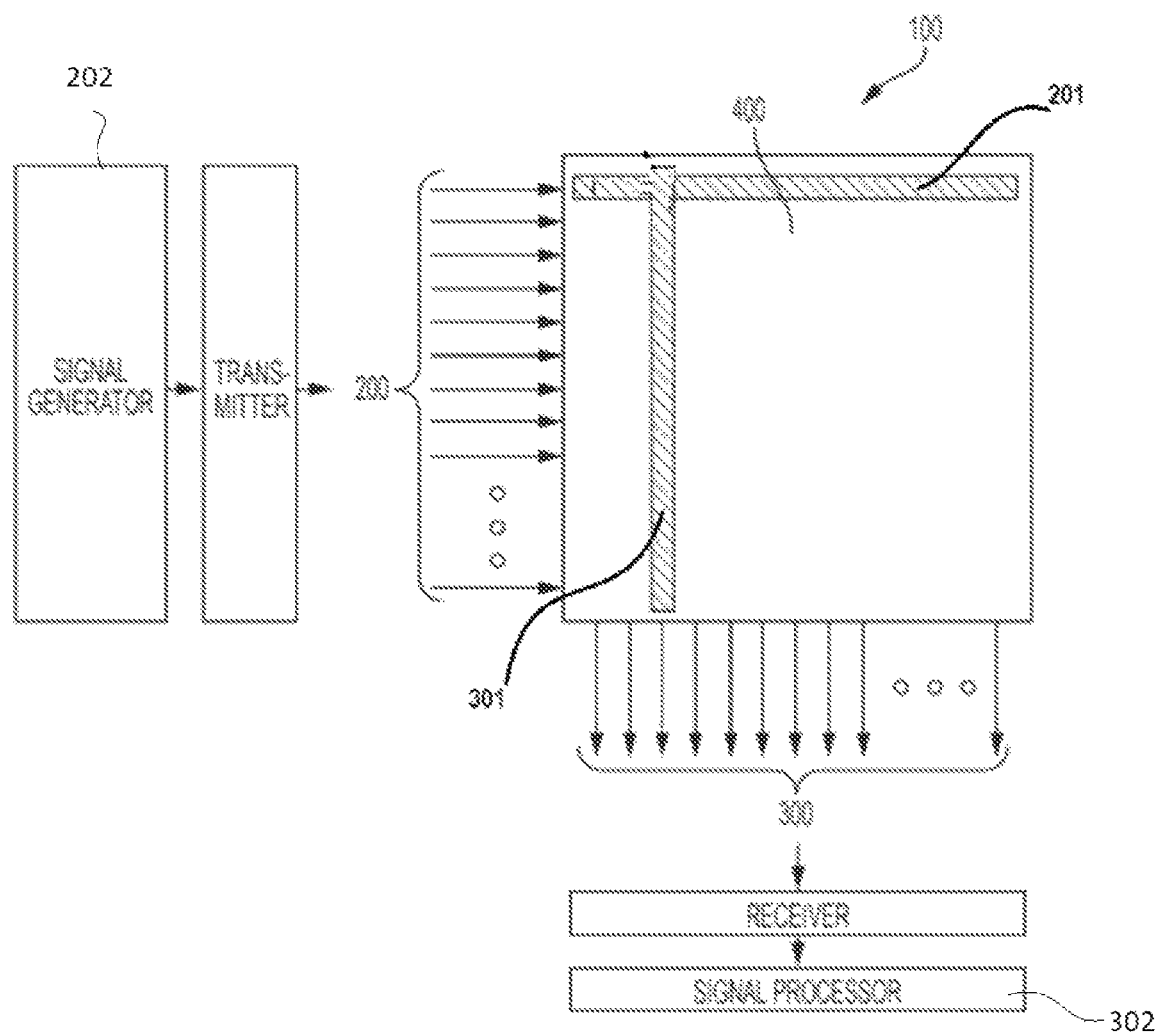
FIG. 1 is a high level block diagram illustrating an embodiment of a low-latency touch sensor device.

In various embodiments, the present disclosure is directed to systems (e.g., objects, panels or keyboards) sensitive to hover, contact and pressure and their applications in real-world, artificial reality, virtual reality and augmented reality settings. It will be understood by one of ordinary skill in the art that the disclosures herein apply generally to all types of systems using fast multi-touch to detect hover, contact and pressure. In an embodiment, the present system and method are applied to panels and display surfaces, including but not limited to smart boards, smart pads and interactive displays.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods involve principles related to and for designing, manufacturing and using capacitive based sensor systems, and particularly capacitive based sensor systems that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensor systems. In such sensor systems, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540, 458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

FIG. 1 illustrates certain principles of a fast multi-touch sensor 100 in accordance with an embodiment. Transmitter 200 transmits a different signal, generated by signal generator 202, into each of the row conductors 201 of the surface 400. The signals are designed to be "orthogonal", i.e., separable and distinguishable from each other. A receiver 300 is attached to each column conductor 301 and has operatively connected thereto a signal processor 302. The row conductors 201 and the column conductors 301 are conductors/antennas that are able to transmit and/or receive signals. The receiver 300 is designed to receive any of the transmitted signals, or an arbitrary combination of them, with or without other signals and/or noise, and to individually determine a measure, e.g., a quantity for each of the orthogonal transmitted signals present on that column conductor 301. The sensor 100 comprises a series of row conductors 201 and column conductor conductors 301 (not all shown), along which the orthogonal signals can propagate. In an embodiment, the row conductors 201 and column conductors 301 are arranged such that a touch event will cause a change in coupling between at least one of the row conductors 201 and at least one of the column conductors 301. In an embodiment, a touch event will cause a change in the amount (e.g., magnitude) of a signal transmitted on a row conductor 201 that is detected in the column conductor 301. In an embodiment, a touch event will cause a change in the phase of a signal transmitted on a row conductor 201 that is detected on a column conductor 301. Because the sensor 100 ultimately detects a touch event due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor 201 as it is detected on a column conductor 301. In an embodiment, the change in coupling may be detected by comparing successive measurements on the column conductor 301. In an embodiment, the change in coupling may be detected by comparing the characteristics of the signal transmitted on the row conductor 201 to a measurement made on the column conductor 301. In an embodiment, a change in coupling may be measured both by comparing successive measurements on the column conductor 301 and by comparing known characteristics of the signal transmitted on the row conductor 201 to a measurement made on the column conductor 301. More generally, touch events cause, and thus correspond to, measurements of the signals on the column conductors 301. Because the signals on the row conductors 201 are orthogonal, multiple row signals can be coupled to a column conductor 301 and distinguished by the receiver 300. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch event enabled device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row conductor-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors 201 and column conductors 301 may vary as a consequence of a physical process, and the change in the orientation (e.g., movement) of the row conductors 201 and/or column conductors 301 with respect to one-another may cause a change in coupling. In an embodiment, the orientation of a row conductor 201 and a column conductor 301 may vary as a consequence of a physical process, and the range of orientation between the row conductor 201 and column conductor 301 include ohmic contact, thus in some orientations within a range a row conductor 201 and column conductor 301 may be in physical contact, while in other orientations within the range, the row conductor 201 and column conductor 301 are not in physical contact and may have their coupling varied. In an embodiment, when a row conductor 201 and column conductor 301 are not in physical contact their coupling may be varied as a consequence of moving closer together or further apart. In an embodiment, when a row conductor 201 and column conductor 301 are not in physical contact their coupling may be varied as a consequence of grounding. In an embodiment, when a row conductor 201 and column conductor 301 are not in physical contact their coupling may be varied as a consequence of materials translated within the coupled field. In an embodiment, when a row conductor 201 and column conductor 301 are not in physical contact their coupling may be varied as a consequence of a changing shape of the row conductor 201 or column conductor 301, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). The notion that signals are transmitted on row conductors 201 and received on column conductors 301 itself is arbitrary, and signals could as easily be transmitted on conductors arbitrarily designated columns and received on conductors arbitrarily named rows, or both could arbitrarily be named something else. Further, it is not necessary that row conductors 201 and column conductors 301 be in a grid. Other shapes are possible as long as a touch event will affect a row-column coupling. For example, some of the conductors could be in concentric circles and some of the conductor could be spokes radiating out from the center. And neither the "rows conductors" nor the "column conductors" need to follow any geometric or spatial pattern, thus, for example, the keys on a keyboard could be arbitrarily connected to form row conductors 201 and column conductors 301 (related or unrelated to their relative positions). Moreover, an antenna may be used as a row conductor 201 (e.g., having a more defined shape than a simple conductor wire such as for example a row made from ITO). For example an antenna may be round or rectangular, or have substantially any shape, or a shape that changes. An antenna used as a row conductor 201 may be oriented in proximity to one or more conductors, or one or more other antennas that act as column conductors 301. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types signal propagation channels: instead of row conductors 201 and column conductors 301, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row. In an embodiment, multiple orthogonal signals are transmitted on each transmit antenna.

Returning briefly to FIG. 1, as noted above, in an embodiment, the sensor 100 is operably connected to a touch surface 400 and comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

A receiver 300 is attached to each column conductor 301, which has a signal processor 302 operatively connected thereto. The receiver 300 is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the signal processor 302 associated with the receiver data may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate, e.g., the area of the surface covered by the touch, the pressure of the touch, etc. In an embodiment, a change in coupling over time between the corresponding row conductor 201 and column conductor 301 indicates a change in touch at the intersection of the two.

In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antenna. In an embodiment, the mixed signal integrated circuit is adapted to generate a plurality of frequency-orthogonal signals and send one or more of the plurality of frequency-orthogonal signals to each of a plurality of row conductors. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row conductor.

In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

When dealing with a touch panel or display employing sensors, such as described above, many factors come into play that governs the detection of signals and consequently touch events. The crosstalk between row conductors and column conductors plays a role in determining touch events. The coupling magnitude and the phase in any region of the display or the sensor also plays a role in determining the touch events. For example, the type of conductor used for the row conductors and column conductors plays a factor in determining touch events. The mutual capacitance in the near field between a row conductor and another row conductor also plays a factor in determining touch events. The mutual capacitance between a row conductor and another column conductor plays a factor in determining touch events. The mutual capacitance between a column conductor and another column conductor plays a factor in determining touch events. The mutual inductance in the near field between a row conductor and another row conductor plays a factor in determining touch events. The mutual inductance between a row conductor and another column conductor plays a factor in determining touch events. The mutual inductance between a column conductor and another column conductor plays a factor in determining of touch events. The dielectric and permeability characteristics of the materials between, on, and near row conductors and column conductors additionally play a factor in the determination of touch events.

The signal processor is able to analyze the received signals and detect small changes in the crosstalk/coupling due to the various factors that impact the sensor. At each sensed row conductor/column conductor coupling that is greater than the absolute magnitude of a driven frequency or frequencies of signals can be detected and analyzed by the signal processor. The real component of the received signal of a driven frequency or frequencies of a signal can be detected and analyzed by the signal processor. The imaginary component of the received signal of a driven frequency or frequencies of the signals can be detected and analyzed by the processor. The phase relationship with respect to the real and imaginary components of a driven frequency or frequencies of the coupled signal can increase, decrease, or stay the same with respect to each orthogonal frequency divided separable frequency. These changes can be detected and analyzed by the signal processor.

These detectable changes in received signal components for coupling are repeated for every unique sensed row conductor/column conductor coupling for the entire sensor. Mathematical comparisons can then be made between any two or more sensed row conductor/column conductor coupling, amongst any region or neighborhood of nearby sensed row conductor/column conductor coupling, and/or amongst any two or more such regions.

Now turning to the method for calibrating the panel, in an embodiment, multiple heatmaps for the panel are produced under "no-touch" circumstances. For example the row conductors are driven without there being any interactions with the row conductors. A "heatmap" is a manifestation of the activity on the row conductors and the column conductors. A heatmap is used to indicate where activity is occurring on the panel. The multiple heatmaps taken under no-touch circumstances are averaged in order to produce a single heatmap with noise averaged out of the response. This baseline heatmap is used as a reference heatmap against which new incoming touches are compared with. The more heatmaps taken without the presence of touch events the more reliable the baseline heatmap will be due to the minimization of the impact of any anomalous heat map determination.

In an embodiment, the activity of the row conductors and the column conductors is fully characterized across the full spectrum of potential signals. In an embodiment, the activity of the row conductors and the column conductors is fully characterized using the most frequently used potential signals. Additionally, In an embodiment, equalizing of the output on the row conductors and equalizing of the input on the columns conductors occurs so as to provide accurate results in the determination of the baseline heatmaps and ultimately fine tuning the calibration.

This method treats an entire panel of row conductors and column conductors as a multiple-input/multiple output (MIMO) passive filter. In an embodiment, the frequency and phase response (i.e. the spectral response) for all the tone frequencies used in the panel are characterized. All taxels (i.e. potential locations for touch events occurring on the touch panel) should have a similar response to each touch event despite different frequencies, noise, panel signal transmission characteristics, etc.

Therefore each potential coupling between row conductors and column conductors can be considered as a point within a larger passive filter, and has a complete spectral response between its specific input and output. It should be understood that the potential location of a coupling can refer to the intersection of row conductor and column conductor or any point where there can be interaction between a row conductor and a column conductor. Additionally, it should be understood that the potential location of a coupling can refer to any location in a panel or device a touch event can be detected, regardless of the existence of rows and columns. For ease of discussion, this potential location for potential interaction between the row conductor and the column conductor, or any interaction between a conductor/antenna and another conductor/antenna will be referred to as a "taxel."

To measure the response of a potential coupling between a row conductor and column conductor, in an embodiment a uniformly distributed wideband (i.e. white-noise) signal can be transmitted across the panel and used to capture the FFT for a specific row conductor to column conductor coupling. While reference is made to a white-noise signal, it should be understood that this is referring to a subset of all possible signals and is referring to the subset of signals that are capable of being transmitted on any given panel. In an embodiment, the impulse response could be gathered and/or a pure clean tone (chirp signal) may be transmitted as an input and the relevant FFT response can be gathered over time.

Every potential coupling between a row conductor and a column conductor can be analyzed. Each input row conductor and output column conductor combination can be stimulated and its FFT captured. This results in a complete complex FFT vector per taxel and when concatenated for the entire panel gives a 3D volume of complex number data.

The 3D volume of complex number data represents how each taxel responds. In an embodiment, the response is the gain and phase for each frequency of interest. In an embodiment, the response is the gain, phase and the offset for each frequency of interest. This process can be repeated over time to determine which portions of the spectral response are stable and which portions of the spectral response are prone to external noise disturbances. This process can also be used to determine which portions of the spectral response give a poor transfer response due to cross-coupling, harmonics or nonlinear mixing of signals that are transmitted across the panel.

In an embodiment, the calibration method is run during a factory calibration of the panel. In an embodiment, the calibration method is run at initialization of the system. In an embodiment, the calibration method is run sporadically as needed or desired during runtime to check for changes in environmental noise and/or changes in the panel. In an embodiment, the calibration method is run periodically during runtime or during a predetermined schedule in order to ensure optimal performance. In an embodiment the calibration method is run adaptively or responsively with respect to environmental changes. For example, changes that may impact a panel can be temperature fluctuations, environmental temperatures, physical disturbances of the panel and wear-and-tear damage. Upon determination of these types of disturbances, the calibration method may be run again in order to ensure optimal performance.

The panel system can measure the FFT spectral response for each row conductor and column conductor. In an embodiment, the transmitter signal generator is adapted to transmit a white noise subset (i.e. a set of frequencies with equal intensity capable of being handled by the panel) in order to measure the FFT spectral response for each row conductor and column conductor. In an embodiment, the transmitter signal generator is adapted to transmit a plurality of signals of interest in order in order to measure the FFT spectral response for each row conductor and column conductor. In an embodiment, the transmitter signal generator is adapted to transmit chirp signals for sweeping each row conductor and column conductor in order to measure the FFT spectral response for each row conductor and column conductor. In an embodiment, the transmitter signal generator is adapted to transmit impulses (i.e. spread-spectrum sources) for each row conductor and column conductor. In an embodiment, the transmitter signal generator is adapted to transmit any one of or combination of chirp signals, white noise, or impulses for each row conductor and column conductor in order to measure the FFT spectral response for each row conductor and column conductor. In an embodiment, the transmitter signal generator is adapted to transmit signals depending on the type of activity that occurred that necessitated the calibration in order to measure the FFT spectral response for each row conductor and column conductor.

Figure 2:
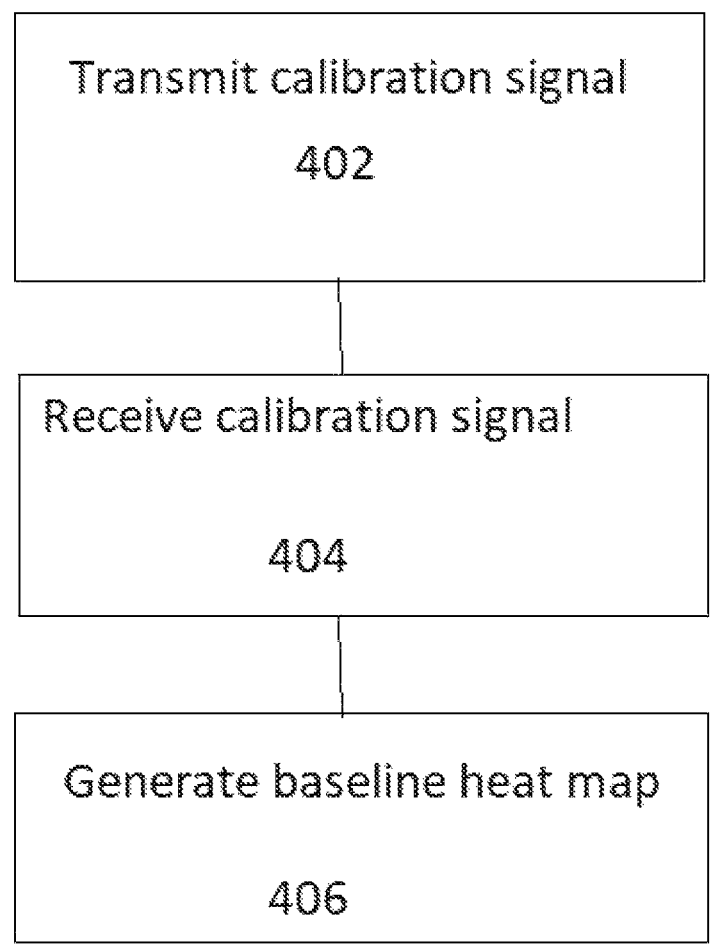
FIG. 2 is a flow chart illustrating a method for establishing a heat map.

Referring now to FIG. 2, shown is a flowchart setting out the calibration method. In step 402, a calibration signal is transmitted. The calibration signal or calibration signals that are transmitted may be any type of the calibration signals discussed above. For example, in an embodiment the calibration signal is a "white noise" signal. The white noise signal is a heterogeneous mixture of signals extending over a wide frequency range. In an embodiment the white noise signal may be transmitted over a series of time events, i.e. in a number of frames. In an embodiment, the calibration signal may be transmitted in conjunction with other types of calibration signals such as discussed above. For purposes of this discussion the calibration signal is a white noise signal subset that is transmitted over a predetermined number of frames. The more frames on which the calibration signal is sent the less likely the measurements taken will be subject individual errors or discrepancies that occur from one frame to the next. In other words the more samples taken the more accurate the calibration will be.

In an embodiment the calibration signal may be signals transmitted at various frequencies across all of the row conductors. For example, the calibration signals can be an iterative increase in the signal frequency over a period of time. For example, a frequency of 10 Khz during the first period of time, a frequency of 10.1 Khz during the second period of time, etc. In an embodiment, the calibration signals can be a cascade of signals across the row conductors. For example, each row conductor may transmit a different frequency and those different frequencies may be transmitted down each row conductor sequentially. For example, frequency 1 (F1) to frequency n (Fn) can be transmitted on row conductors 1 through n during the first frame. During the second frame, frequencies F1 to (Fn−1) can be transmitted down row conductors 2 through n, with frequency Fn transmitted down row conductor 1. In an embodiment, a specific signal can be transmitted along each row conductor to ascertain how a specific taxel will respond.

In step 404, the calibration signal or signals are received at the receiver and processed by the signal processor. Each of the calibration signals received are measured.

In step 406, a baseline heat map is created based on the received calibration signals. The baseline heat map is used as a reference point from which future touch events measured at various taxels are able to be compared. For example, the baseline heat map can provide a baseline measurement for each taxel for different transmitted frequencies. If a particular taxel illustrates a certain level of noise at a particular frequency, that frequency may be avoided. Additionally, if a particular taxel illustrates a certain level of noise in specific regions or locations the noise found there can be compensated for.

In an embodiment, an equalization algorithm is used to optimally level out and equalize all the transmission and receive combinations for each of the frequencies transmitted. The equalization algorithm may be employed during any of the calibration steps in order to establish accuracy for the touch panel. The equalization algorithm may be established during creation of the touch panel or may be run iteratively during runtime in order to save field programmable gate array resources (FPGA). In an embodiment, the equalization algorithm is implemented by cycling through pairs of taxels or larger subsets of taxels.

Frequencies may be selected dynamically in order to account for various aspects of the touch panels that are established upon the receipt of the calibration heat map. This provides a frequency agile solution to mitigate noise. In an embodiment, the calibration of the touch panel further enables transmitter phases to be computed in a manner that accounts for phase properties of the sensor. In an embodiment, the calibration method is used to understand the specific response of every taxel to its respective input.

In an embodiment, each row conductor is calibrated to establish its signal's gain and offset magnitude against each other so that they are all equal. Additionally, the receiver for the gain, offset and dynamic range of the signal received at the columns conductors can be compared against each other so that they are equal. In an embodiment, the generalized transmitter output to the now generalized receiver input is calibrated for maximum power transfer and lowest noise coupling.

In an embodiment, the coupling between a row conductor and column conductor is established for the optimum response for maximum sensitivity. In an embodiment, the coupling between a row conductor and column conductor is established for the optimum response for dynamic range. In an embodiment, the coupling between a row conductor and column conductor is established for the optimum response for lowest noise determining a baseline for detecting change.

Figure 3:
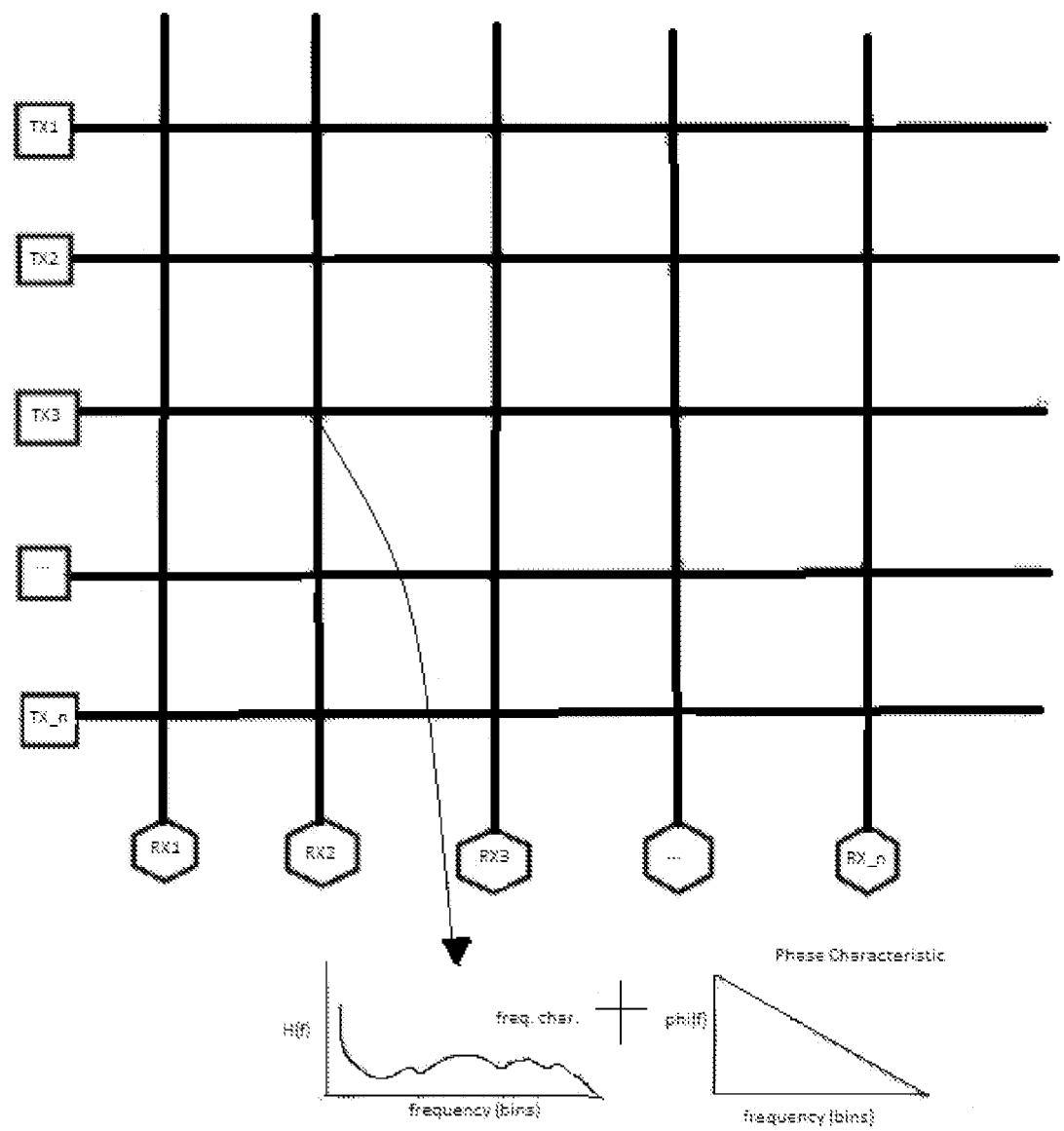
FIG. 3 is a diagram showing a grid of row conductors and column conductors upon which signals are transmitted.

FIG. 3 shows a grid of rows conductors and columns conductors that can make up a touch panel display. At the locations where the rows conductors and the columns conductors interact, these interactions can be used in creating the heat maps for calibration. Each intersection of the row conductors and column conductors (i.e. a taxel) will be fully characterized by its full spectrum response (both frequency and phase) when using this calibration method.

An embodiment of the disclosure is a method for calibrating a touch panel comprising: transmitting a plurality of signals on a plurality of transmitting conductors adapted to transmit a plurality of signals, wherein the plurality of signals are transmitted during a first frame; receiving at least some of the plurality of signals at a plurality of receiving conductors; measuring the at least some of the plurality of signals received; generating a baseline heat map based on the measured at least some of the plurality of signals received, wherein the generated baseline heat map provides reference for calibration of the touch panel.

Another embodiment of the disclosure is a method for calibrating a touch panel. The method comprises transmitting a first plurality of signals on a plurality of transmitting conductors adapted to transmit signals, wherein the first plurality of signals are transmitted during a first frame, wherein each of the first plurality of signals are a different frequency from each other of the first plurality of signals transmitted during the first frame; receiving at least some of the first plurality of signals at a plurality of receiving conductors; measuring the at least some of the first plurality of signals received; transmitting a second plurality of signals on the plurality of transmitting conductors, wherein the second plurality of signals are transmitted during a second frame, wherein each of the second plurality of signals are a different frequency from each other of the second plurality of signals transmitted during the second frame; measuring the at least some of the second plurality of signals received; generating a baseline heat map based on the measured at least some of the first plurality of signals received and the at least some of the second plurality of signals received, and detecting a touch event occurring on the touch panel wherein during detection of the touch event, the baseline heat map based on the measured at least some of the first plurality of signals received and the measured at least some of the second plurality of signals, wherein the generated baseline heat map provides reference for calibration of the touch panel.

The several embodiments discussed above illustrate a variety of methods for calibrating a touch panel, but are not intended to limit the scope of the claims. Other variations of the method will become apparent to persons of skill in the art in view of this disclosure, and are thus included within the scope of this disclosure.

While the invention has been particularly shown and described with reference to a preferred embodiment thereof, it will be understood by those skilled in the art that various changes in form and details may be made therein without departing from the spirit and scope of the invention.

The invention claimed is:

1. A method for calibrating a sensor comprising:
transmitting a first plurality of signals on a plurality of transmitting conductors adapted to transmit signals, wherein the first plurality of signals are transmitted during a first frame, wherein the first plurality of signals comprises a plurality of different frequencies transmitted during the first frame and wherein the first frame is a no-touch circumstance, wherein the first plurality of signals transmitted during the first frame are a white noise subset;
receiving a first receive frame on a plurality of receiving conductors adapted to receive signals, wherein the first receive frame is a non-video frame;
measuring the first receive frame to determine the spectral components therein;
transmitting a second plurality of signals on the plurality of transmitting conductors, wherein the second plurality of signals are transmitted during a second frame, wherein the second plurality of signals comprises a plurality of different frequencies during the second frame and wherein the second frame is a no-touch circumstance;
receiving a second receive frame on the plurality of receiving conductors, wherein the second receive frame is a non-video frame;
measuring the second receive frame to determine the spectral components therein;
generating a baseline heat map based only on the measured spectral components of transmitted signals, wherein at least the measured spectral components in the first frame and the measured spectral components in the second frame form the baseline heat map, wherein the baseline heat map provides a calibration reference for the touch panel, wherein all frames used to form the baseline heat map are no touch frames.

2. The method of claim 1, wherein the second plurality of signals have the same frequencies as the first plurality of signals.

3. The method of claim 2, wherein each of the first plurality of signals are transmitted on different transmitting conductors than each of the second plurality of signals.

4. The method of claim 1, wherein the baseline heat map based on the measured at least some of the first plurality of signals received is used to enhance sensitivity of a touch events detected.

5. The method of claim 1, wherein the baseline heat map based on the measured spectral components in the first frame and the measured spectral components in the second frame is used to enhance responsiveness of touch events detected.

6. The method of claim 1, wherein the baseline heat map based on the measured spectral components in the first frame and the measured spectral components in the second frame is used to enhance dynamic range of touch events detected.

7. The method of claim 1, wherein the baseline heat map based on the measured spectral components in the first frame and the measured spectral components in the second frame is used to mitigate noise when touch events are detected.

8. The method of claim 1, wherein the first plurality of signals transmitted on the plurality of transmitting conductors are a subset of the total transmitting conductors present in the touch panel.

9. A method for calibrating a sensor comprising:
transmitting a plurality of signals on a plurality of transmitting conductors adapted to transmit a plurality of signals, wherein the plurality of signals transmitted during the are a white noise subset, during each of a plurality of frames;
receiving a plurality of receive frames on a plurality of receiving conductors adapted to receive signals, wherein each of the plurality of receive frames is a non-video frame;
measuring at least some of the plurality of receive frames to determine the spectral components therein,
generating a baseline heat map based only on the measured spectral components of the transmitted plurality of signals, wherein the baseline heat map provides a calibration reference for the touch panel; and,
wherein each of the plurality of receive frames is a no-touch circumstance and wherein all frames used to form the baseline heat map are no-touch circumstance frames.

10. The method of claim 9, further comprising:
transmitting during each of a plurality of different frames a plurality of signals on a plurality of transmitting conductors adapted to transmit a plurality of signals,
receiving a plurality of different receive frames on a plurality of receiving conductors;
measuring at least some of the plurality of different receive frames to determine the spectral components therein; and,
generating a touch heat map based on the measured spectral components of the measured at least some of the plurality of different receive frames; and,
comparing the touch heat map and the baseline heat map to detect at least one touch event.

11. The method of claim 10, wherein each of the plurality of different frames is a touch circumstance.

12. The method of claim 11, wherein each of the plurality of receive frames and the plurality of different receive frames comprise a plurality of received signals; and wherein the steps of measuring further comprise determining the spectral response of at least one received signal of the plurality of received signals.

13. The method of claim 9, wherein the plurality of receive frames comprises a plurality of received signals; and wherein the step of measuring further comprises determining the spectral response of at least one signal of the plurality of signals.

14. The method of claim 9, wherein the baseline heat map is used to enhance sensitivity of touch events detected.

15. The method of claim 9, wherein the baseline heat map is used to enhance responsiveness of touch events detected.

16. The method of claim 9, wherein the baseline heat map is used to enhance dynamic range of touch events detected.

17. The method of claim 9, wherein the baseline heat map is used to mitigate noise when touch events are detected.

* * * * *